March 26, 1957  V. V. MASON ET AL  2,786,399
FORMATION OF CRUMPLED SHEET MATERIAL
FILTER ELEMENTS AND THE LIKE
Filed March 6, 1952  2 Sheets-Sheet 1
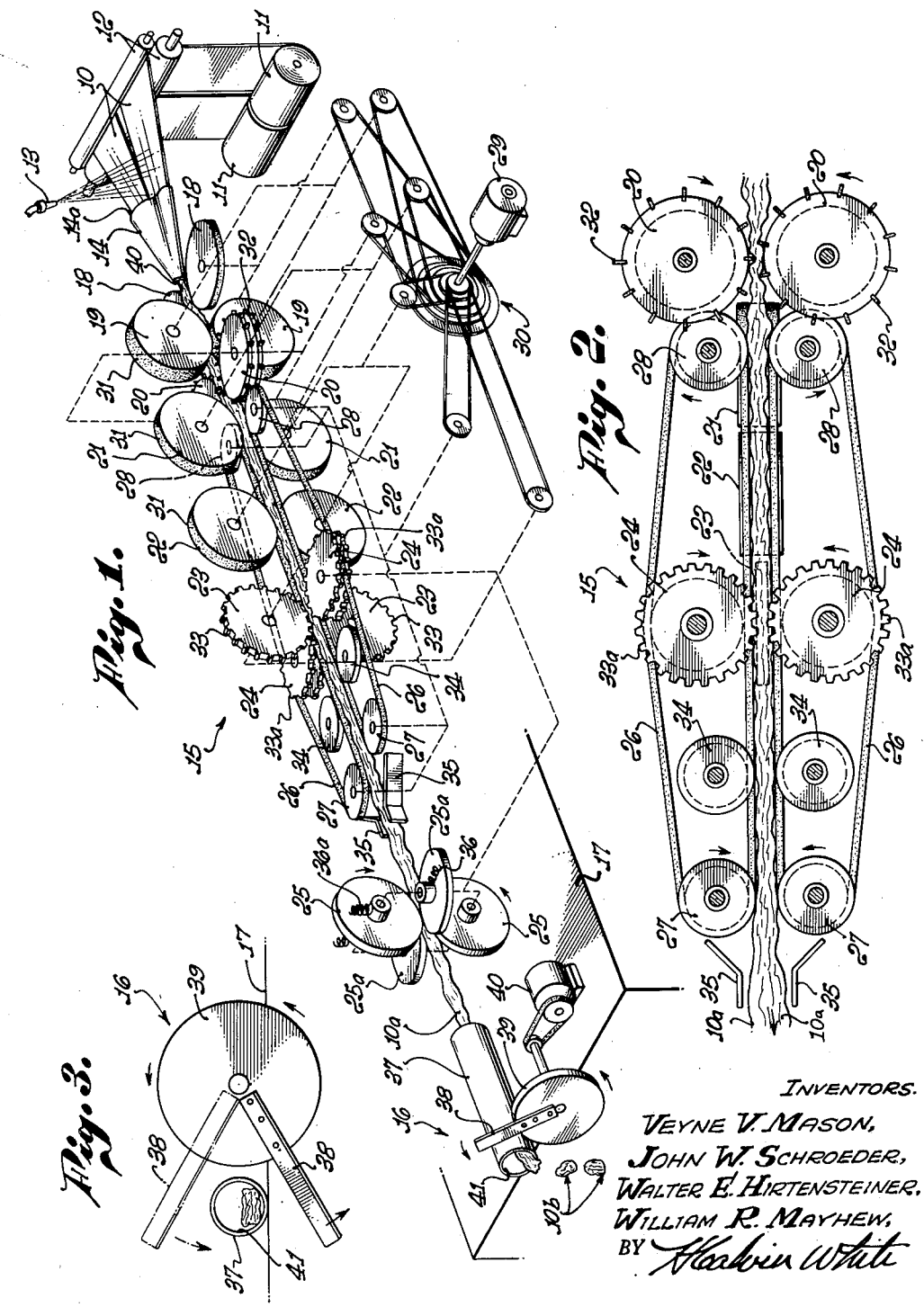
INVENTORS.
VEYNE V. MASON,
JOHN W. SCHROEDER,
WALTER E. HIRTENSTEINER,
WILLIAM R. MAYHEW,
BY
ATTORNEY.

March 26, 1957
V. V. MASON ET AL
2,786,399
FORMATION OF CRUMPLED SHEET MATERIAL
FILTER ELEMENTS AND THE LIKE
Filed March 6, 1952
2 Sheets-Sheet 2
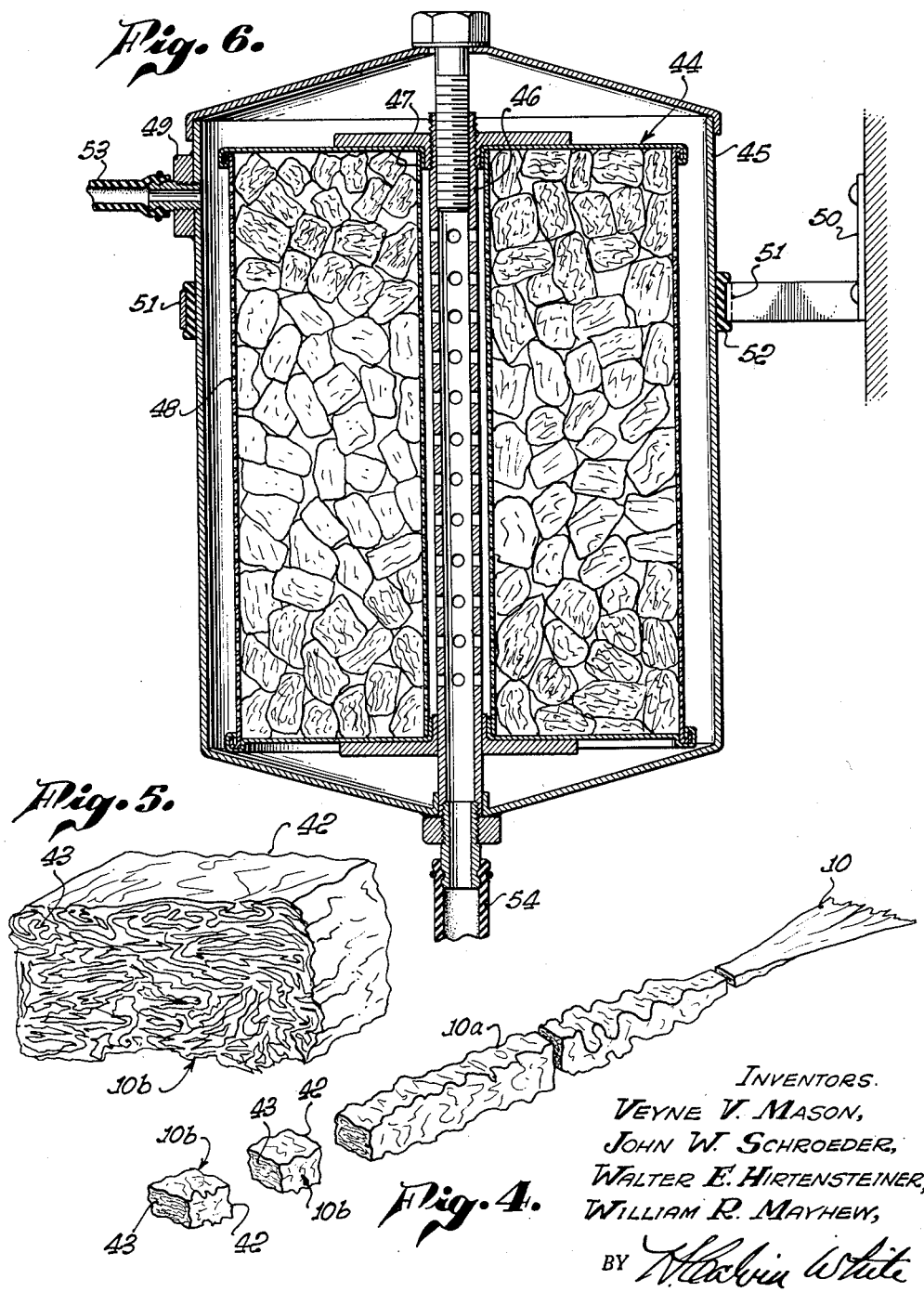
INVENTORS.
VEYNE V. MASON,
JOHN W. SCHROEDER,
WALTER E. HIRTENSTEINER,
WILLIAM R. MAYHEW,
BY
ATTORNEY.

United States Patent Office

2,786,399
Patented Mar. 26, 1957

2,786,399

FORMATION OF CRUMPLED SHEET MATERIAL FILTER ELEMENTS AND THE LIKE

Veyne V. Mason, Los Angeles, William R. Mayhew, Pasadena, John W. Schroeder, Monterey Park, and Walter E. Hirtensteiner, Hermosa Beach, Calif.

Application March 6, 1952, Serial No. 275,152

21 Claims. (Cl. 93—1)

This invention relates to the formation of bodies of crumpled sheet material, of a type particularly adapted for use as engine oil filter elements.

In Patent Number 2,549,698, issued April 17, 1951, to Veyne V. Mason on Engine Oil Filters, there is disclosed a novel type of filter unit, which employs as a filter medium a mass of sheet material crumpled in a manner to present sharply defined fluid contacting fold edges and intermediate impurity receiving voids. As disclosed in that patent, the filter mass is formed of paper, and comprises a plurality of individual pellets compacted together in intercontacting relation.

A major object of the present invention is to provide improved methods and apparatus for forming such masses of crumpled paper or other sheet material usable as filtering media. Briefly, the invention contemplates progressively advancing a sheet of material in the direction of one of its edges, and crumpling it transversely of its path of movement during such movement. Preferably, the material is also crumpled longitudinally of the path of movement, to present as many sharp folds as possible and thus maximize its filtering effectiveness. After being crumpled and compacted into a continuous elongated strand, the material may be cut at spaced locations to form relatively small pellets to be compacted together in a filter cartridge.

The transverse crumpling and compaction may be effected in part by passing the bodily advancing material through a constriction along its path of movement, the constriction preferably being formed as a converging funnel-like throat. Continuous and progressive advancement of the material may be effected by employing a movable member acting to progressively engage and advance successive portions of the material.

Preferably, the paper crumpling mechanism includes one or more rollers laterally engaging the material to crumple and compact it transversely of its path of movement. These rollers may engage the material beyond the funnel-like unit, to supplement its crumpling and compacting effect. To assure retention of the material in its crumpled condition after release by the rollers, we find it desirable to employ a preferably rotatable element having teeth or projections laterally engaging and bearing against the crumpled material. These teeth act to locally compact the material in a manner setting it against excessive subsequent expansion.

To longitudinally crumple the material, we may employ means acting to engage the material at spaced locations along its path of movement and advance it at rates of speed relatively decreasing in the direction of movement of the material. The previously mentioned rollers may be employed for this purpose, successive rollers or sets of rollers being driven at progressively decreasing speeds for advancing the material at decreasing rates. To assure an effective longitudinal crumpling action, the rollers may be provided with surface portions of friction material acting to engage and positively grip the material being handled. These rollers then also serve as the drive for advancing the material through the funnel-like crumpling unit.

To enhance the filtering characteristics of the crumpled paper, we preferably apply to the surface of the paper a discontinuous coating of a resinous plastic material. This material may be sprayed onto the surface of the sheet paper as it advances toward the crumpling mechanism.

The above and other features and objects of the present invention will be better understood from the following detailed description of the typical embodiment illustrated in the accompanying drawings, in which:

Fig. 1 is a perspective partially diagrammatic view of a machine for forming pellets of crumpled sheet material, typically newsprint paper, to be used in engine oil filter cartridges;

Fig. 2 is an enlarged plan view of a portion of the crumpling mechanism in Fig. 1;

Fig. 3 is an end view of the cutter mechanism of Fig. 1;

Fig. 4 is an enlarged fragmentary perspective view of the paper showing its different conditions as it passes through the apparatus of Fig. 1;

Fig. 5 is an enlarged perspective view of one of the pellets formed by the Fig. 1 apparatus; and Fig. 6 is a vertical section through a filter element employing as a filtering material the pellets formed by the machine of Figs. 1 to 3.

During the operation of the Fig. 1 apparatus, elongated strips or sheets of newsprint paper are progressively and continuously advanced to the left as seen in that figure. The apparatus acts to crumple the newsprint from its initial sheet condition, shown at 10, into an elongated strand of crumpled paper at 10a, and to then cut strand 10a into a number of individual pellets 10b of the crumpled material. The newsprint may be fed to the machine from a pair of side-by-side supply rolls 11, from which two strips of the paper may pass upwardly between rollers 12 and then horizontally to the crumpling and cutting apparatus. After leaving rollers 12, the paper may pass beneath a nozzle 13 through which a spray of air-drying resinous plastic material mixed with water is directed downwardly onto the surface of the paper.

The crumpling of the paper is effected by passing it first through a converging funnel-like element 14, and then through a roller assembly generally indicated at 15. Beyond the roller assembly, the strand 10a of crumpled newsprint is passed through a cutting unit 16, which acts to intermittently cut transversely through the strand to divide it into the pellets 10b. All of the parts of the apparatus may be mounted to a suitable framework, which is typically and fragmentarily represented at 17.

The plastic material sprayed onto the upper surface of the newsprint paper by nozzle 13 comprises a resinous material adapted to increase the electrostatic filtering effect of the newsprint in the ultimate filter element. The spray from nozzle 13 is adjusted to extend across the entire width of both of the sheets 10, but preferably is of a density to only partially cover the upper surface of the paper. Best results are achieved by using a resinous plastic of a type adapted to dry in air at room temperature, and to do so relatively rapidly. This plastic should of course be insoluble in the oil or other fluid being filtered and desirably has a high dielectric strength above about 450 and preferably about 550 volts per mil. Very good results have been obtained by use of a plastic solution of the following composition: 20% polyvinyl chloride resin, 20% toluene or methyl isobutyl ketone, and 60% methyl ethyl ketone.

Funnel-like element 14 comprises a rigid tubular member converging from an inlet end 14a of a size to receive the uncrumpled sheet paper, to a reduced dimension outlet end 14b. As will be appreciated, advancement of the paper through member 14 progressively crumples it transversely of the direction of movement and into an elongated strand of crumpled material.

The roller assembly 15 acts to further crumple and compact the newsprint paper transversely of the elongated strand, and also to crumple and compact the material longitudinally. For effecting these purposes, assembly 15 includes a number of pairs or sets of radially opposed rollers engaging and bearing against opposite sides of the strand of crumpled material at several locations along its path of movement. Preferably, different pairs of the rollers turn about axes extending in relatively perpendicular directions, so that the paper is engaged and compacted along four different sides.

The rollers may typically be arranged in the manner illustrated in Figs. 1 and 2, in which some of the pairs of rollers turn about horizontal axes, while other pairs rotate about vertical axes. In this arrangement, the first rollers engaged by the newsprint paper after passage through funnel-like member 14 are a pair of horizontally opposed rollers 18 turning about parallel vertical axes and engaging opposite sides of the crumpled paper strand. Beyond rollers 18, the paper passes between a pair of vertically opposed rollers 19, which turn about parallel horizontal axes and engage the top and bottom sides of the paper strand. The paper then passes in succession between horizontally opposed rollers 20, vertically opposed rollers 21, vertically opposed rollers 22, a set of four rollers including vertically opposed rollers 23 turning about parallel horizontal axes and horizontally opposed rollers 24 turning about parallel vertical axes, and a final set of four compaction rollers including vertically opposed top and bottom rollers 25 and horizontally opposed side rollers 25a. During at least a part of its travel through the roller assembly 15, the paper strand is laterally retained along its opposite sides by suitable guide means, which may comprise a pair of horizontally opposed endless belts 26 mounted and driven by rollers 27 and 28, and moving in a direction such that their inner paper-engaging extents advance in the same direction as the paper.

All of the various rollers and the belt drive pulleys 27 and 28 are rotatively driven in predetermined timed relation by a motor 29 through any suitable type of drive connection. The mountings and drive connections of these rollers and pulleys are schematically represented by the various broken-lines passing through the roller and pulley axes in combination with the drive belt arrangement generally indicated at 30. The drive relationship between the first five pairs of rollers, that is, rollers 18, 19, 20, 21 and 22, is such that successive pairs in the direction of paper movement advance the paper at progressively decreasing rates, to cause a longitudinal crumpling of the paper between successive pairs of rollers. More specifically, the paper engaging surfaces of rollers 19 move at a rate slower than the paper engaging surfaces of rollers 18, while rollers 20 turn at a still slower rate, etc., so that the paper is progressively longitudinally crumpled.

In order that the first five sets of rollers may be effective to thus longitudinally crumple as well as to transversely compact the paper strand, each of these rollers may be provided with a paper engaging portion formed of a friction material, typically rubber, adapted to positively grip and control the movement of the paper. For this purpose, rollers 18, 19, 21 and 22 may have outer cylindrical surface portions 31 of rubber, and rollers 20 may be provided with circular series of radially outwardly projecting paper engaging resilient rubber lugs or fingers 32. Preferably, each of the rollers 20 has two such circular series of paper engaging fingers 32 carried in axially spaced relation, to receive between the two series of fingers a portion of one of the belt mounting pulleys 28 and the corresponding belt 26.

Rollers 23 and 24 serve the purpose of engaging and further compacting the paper at spaced localized areas, in a manner minimizing the extent to which it will expand after leaving the crumpling apparatus, or in other words "setting" it in the compacted condition. To attain such localized compaction of the paper, rollers 23 and 24 are provided with circularly spaced radially outwardly extending peripheral teeth 33 and 33a, which engage and bear against the four sides of the paper strand. Each of the side rollers 24 of this group of rollers may have two axially spaced series of such teeth, and be annularly recessed between the two sets of teeth to receive belts 26. Rollers 24 then serve to retain the inner extents of the belts in their illustrated positions for properly retaining and guiding the paper strand. Between toothed rollers 24 and the belt pulleys 27, a pair of idler pulleys 34 may be provided for supplementing the effect of rollers 24 in retaining the inner extents of the belts against lateral displacement. The toothed rollers 23 and 24 are preferably driven at the same peripheral speed as the next preceding rollers 22.

Beyond belts 26, a pair of converging and then parallel lateral guides 35 may be provided for directing the crumpled and compacted paper toward the final set of rollers 25 and 25a. These rollers 25 and 25a engage the top and bottom and opposite sides of the paper strand to effect a final compaction of the strand before delivery to the cutter 16. To maximize the effectiveness of this final compaction, one of the side rollers 25a may be yieldingly urged by a spring 36 toward the opposite roller and against the paper, and one of the top and bottom rollers 25 may be similarly yieldingly urged by spring 36a toward its opposed roller and against the paper.

The cutting mechanism 16 includes a tubular guide 37 through which the crumpled strand of newsprint 10a is passed after leaving rollers 25 and 25a. The actual cutting operation is effected by a sharp knife-like cutting element 38, which projects radially from and turns with a rotating wheel 39, driven by a motor 40. Wheel 39 rotates continuously during operation of the apparatus to successively move cutter 38 downwardly across the exit end 41 of tube 37, to thus intermittently cut transversely through the paper strand and divide it longitudinally into pellets 10b.

In placing the apparatus in use, the two supply rolls 11 of newsprint paper are mounted as shown, and paper from these rolls is passed upwardly between rollers 12, then passed horizontally through funnel-like member 14 into engagement with rollers 18. Motors 29 and 40 may then be started, to drive the various rollers of assembly 15 and the cutter. The rollers of assembly 15 then act to continuously advance the paper to the left as seen in Fig. 1, so that it is progressively crumpled transversely and longitudinally and then cut by mechanism 16 into the pellets 10b.

Figs. 4 and 5 show the structural characteristics of the paper pellet itself. As will be understood from its manner of formation, this pellet has a pair of opposite parallel end faces 42 and 43 which are formed by cutter 38, and which are therefore defined by cut edges of the sheet material from which the pellet is made. This sheet material of course extends continuously between faces 42 and 43. The sheet material is crumpled both transversely and longitudinally of an axis extending between end faces 42 and 43, and presents between those faces a large number of randomly arranged sharply defined folded edges, and intermediate voids between the edges. The overall configuration of the pellet is essentially rectangular, by virtue of the relative positioning of the various crumpling rollers and in view of the fact that cutter 38 moves directly transversely through the paper strand. The resinous plastic material applied by sprayer 13 only partially covers the surfaces of the paper, and is not present in sufficient quantities to fill the voids formed between the paper folds.

Fig. 6 represents an engine oil filter device in which the filtering material comprises a mass of intercontacting pellets 10b formed by the mechanism of Figs. 1 to 3. This filter mass may be contained within a replaceable container 44, which is removably mounted within the usual outer shell 45. Container 44 is of annular configuration, and is mounted about an apertured fluid outlet tube 46, which projects upwardly from the bottom of shell 45. The inner and outer cylindrical vertical walls 47 and 48 of container 44 are perforated as shown so that the oil being filtered and entering the shell through inlet fitting 49 may flow radially inwardly through the filter mass to outlet tube 46. As the oil thus passes through the filter mass, the newsprint paper and the plastic discontinuously applied to its surface electrostatically attract carbonaceous and other impurities from the oil, and thus assure the delivery of a clean oil to the outlet tube 46. The separated impurities accumulate within the voids formed between folds of the crumpled material.

Since the filtering effect of the crumpled paper and its carried plastic is largely electrostatic, it is desirable to insulate the filter mass against any electrical connection to ground. Such insulation may be effected by forming all of the mounting and fluid conducting connections to shell 45 in a manner to be electrically insulative. For instance, shell 45 may be mounted to a suitable support 50 by means of a mounting ring 51, which extends about the shell and is insulated from it by an insulative ring 52. Also, the oil supply and discharge lines 53 and 54 may comprise electrically insulative rubber hoses. By such an arrangement, the filter pack and the usual metallic and electrically conductive container 44, tube 46, shell 45, and other parts of the filter unit, are all completely insulated from the engine or other mechanism with which they are associated.

We claim:

1. Apparatus comprising first movable means operable to engage a sheet of material at a first location and progressively advance it along a predetermined path at a first rate, said apparatus including means forming a constriction along said path of a size to progressively crumple said advancing material transversely of said path, second movable means engaging said material at a location spaced beyond said first location and advancing said material at a rate slower than said first rate to crumple and compact the sheet longitudinally of said path, and means for driving said first and second movable means at speeds to advance said material at said two different rates respectively.

2. Apparatus comprising a converging funnel-like unit through which a sheet of material is progressively advanced to progressively transversely crumple the sheet into a strand of crumpled sheet material, first roller means engaging said strand at a first location beyond said funnel-like unit and acting to advance the strand at a first rate, second roller means engaging said strand beyond said first location and advancing said material at a rate slower than said first rate to crumple and compact the material longitudinally of said path, and means for driving said first and second roller means at speeds to advance the strand at said first and second rates respectively.

3. Apparatus comprising a converging funnel-like unit through which a sheet of material is progressively advanced to progressively transversely crumple the sheet into a strand of crumpled sheet material, a plurality of opposed pairs of rollers engaging opposite sides of the strand at spaced locations beyond said funnel-like unit to compact and advance the strand, means driving said pairs of rollers at relative speeds such that the strand engaging surfaces of successive pairs in the direction of strand advancement move at progressively decreasing speeds to crumple the material longitudinally of said strand, rotary elements having teeth engaging and bearing against opposite sides of said strand to increase its compaction at localized areas therealong, and cutter mechanism moving intermittently across the path of said strand to cut transversely therethrough at spaced locations therealong.

4. Apparatus as recited in claim 3 in which said rollers have strand engaging surfaces of friction material and in which different pairs of said rollers and of said rotatable elements have axes disposed generally perpendicularly, and including a pair of endless belts engaging and guiding opposite sides of said strand between said rollers.

5. In an apparatus for progressively advancing a sheet of material along a path and through a constriction to progressively transversely crumple the sheet; first movable means operable to engage said sheet of material at a first location and advance it along said path at a first rate, second movable means engaging said material at a location spaced beyond said first location and advancing said material at a rate slower than said first rate to crumple and compact the sheet longitudinally of said path, and means for driving said first and second movable means at speeds to advance said material at said two different rates respectively.

6. Apparatus as recited in claim 5, in which each of said movable means comprises a unit having a portion laterally engaging said material and moving along an endless path in a direction to effect said advancement of the material.

7. Apparatus as recited in claim 5, in which each of said movable means comprises a pair of opposed rollers acting to laterally compact the material therebetween.

8. Apparatus as recited in claim 5, including cutter mechanism operating to cut transversely through said advancing crumpled material at spaced locations therealong.

9. Apparatus as recited in claim 2, including cutter mechanism operating to cut transversely through said crumpled material at spaced locations therealong.

10. In apparatus for progressively advancing a sheet of material along a path and through a constriction to progressively transversely crumple the sheet; first movable means for engaging opposite sides of said material at a first location along said path to laterally compact the material, and second movable means engaging opposite sides of said material at a second location spaced from the first along said path to further laterally compact the material, said first and second movable means having portions engaging and moving with said material and moving along endless paths, and said second movable means being offset with respect to said first movable means about said path of the crumpled material.

11. In apparatus for progressively advancing a sheet of material along a path and through a constriction to progressively transversely crumple the sheet; a first pair of opposed rollers engaging opposite sides of said material to laterally compact the material, a second pair of opposed compaction rollers engaging opposite sides of said material at a location beyond said first rollers along said path, said second pair of rollers being offset with respect to said first pair of rollers about said path of the crumpled material.

12. Apparatus as recited in claim 11 in which said second rollers are rotatable about axes which are offset approximately ninety degrees with respect to the axes of said first rollers about said path.

13. Apparatus as recited in claim 11, including a funnel-like unit along said path in advance of said first rollers for transversely crumpling said material.

14. Apparatus as recited in claim 11, including means for driving said first rollers at a speed to advance the material at a first rate, and means for driving said second rollers at a speed to advance the material at a second and slower rate to thereby longitudinally crumple the material.

15. Apparatus as recited in claim 14. including cutter mechanism operating to cut transversely through said crumpled material at spaced locations therealong, and a funnel-like unit along said path in advance of said first rollers for transversely crumpling the material.

16. The method comprising bodily advancing a sheet of material along a path, progressively crumpling said sheet transversely of said path as it advances therealong, engaging and acting against said sheet of material at a first location along said path in a manner advancing the sheet along said path at a first rate at said location, and engaging and acting against said material at a second location spaced beyond said first location in a manner advancing the sheet at the second location but at a rate substantially slower than said first rate, and thereby crumpling and compacting the sheet to a reduced dimension longitudinally of said path.

17. The method as recited in claim 16, in which said transverse crumpling of the sheet is effected by advancing said sheet through a constriction along said path.

18. The method as recited in claim 16, including intermittently cutting transversely through said crumpled material at a location beyond said second location to divide it into relatively short sections.

19. The method as recited in claim 16, including transversely compacting said material at said first location in a first transverse direction, and compacting said material at said second location in a second transverse direction which is offset relative to said first direction about the path of movement of said material.

20. The method as recited in claim 16, including engaging and advancing said sheet at a plurality of additional locations beyond said second location and at rates progressively decreasing in the direction of movement of said sheet to additionally crumple the sheet, and transversely compacting said material at said various locations and in a plurality of different transverse directions at different locations.

21. The method as recited in claim 20, in which said transverse crumpling of the sheet is effected by advancing said sheet through a constriction along said path, said method including intermittently cutting transversely through said crumpled material at a location beyond said second location to divide it into relatively short sections.

References Cited in the file of this patent
UNITED STATES PATENTS

| | | |
|---|---|---|
| 596,714 | Purdin | Jan. 4, 1898 |
| 2,045,498 | Stevenson | June 23, 1936 |
| 2,124,926 | Nordstrom et al. | July 26, 1938 |
| 2,164,702 | Davidson | July 4, 1939 |
| 2,221,443 | Davidson | Nov. 12, 1940 |
| 2,255,887 | Katz | Sept. 16, 1941 |
| 2,490,057 | Irmscher | Dec. 6, 1949 |
| 2,549,698 | Mason | Apr. 17, 1951 |
| 2,614,694 | Sather | Oct. 21, 1952 |

FOREIGN PATENTS

| | | |
|---|---|---|
| 124,039 | Austria | Aug. 10, 1931 |